United States Patent
Robl et al.

(10) Patent No.: US 9,760,516 B2
(45) Date of Patent: Sep. 12, 2017

(54) APPARATUS FOR TRANSMITTING AND/OR RECEIVING MEASUREMENT DATA OF A FIELD DEVICE WITH PASSIVE ADAPTER INTERFACE

(71) Applicant: Endress + Hauser Conducta Gesellschaft für Mess—und Regeltechnik mbH + Co. KG, Gerlingen (DE)

(72) Inventors: Stefan Robl, Hunxe (DE); Gunter Jahl, Lochgau (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 163 days.

(21) Appl. No.: 14/427,149

(22) PCT Filed: Aug. 28, 2013

(86) PCT No.: PCT/EP2013/067783
§ 371 (c)(1),
(2) Date: Mar. 10, 2015

(87) PCT Pub. No.: WO2014/040857
PCT Pub. Date: Mar. 20, 2014

(65) Prior Publication Data
US 2015/0242349 A1 Aug. 27, 2015

(30) Foreign Application Priority Data

Sep. 13, 2012 (DE) ........................ 10 2012 108 556

(51) Int. Cl.
*G06F 13/38* (2006.01)
*G05B 19/418* (2006.01)
*G06F 13/40* (2006.01)

(52) U.S. Cl.
CPC ....... *G06F 13/385* (2013.01); *G05B 19/4185* (2013.01); *G06F 13/4068* (2013.01);
(Continued)

(58) Field of Classification Search
CPC ..... H05K 1/141; G01F 1/8409; G06F 13/385; G06F 13/4068; G05B 19/4185
(Continued)

(56) References Cited

U.S. PATENT DOCUMENTS

| 7,561,392 B2 | 7/2009 | Becker |
| 7,640,007 B2 | 12/2009 | Chen |

(Continued)

FOREIGN PATENT DOCUMENTS

| CN | 1804744 A | 7/2006 |
| CN | 2824451 Y | 10/2006 |

(Continued)

OTHER PUBLICATIONS

German Search Report, German Patent Office, Munich, DE, Aug. 1, 2013.
(Continued)

*Primary Examiner* — Tammara Peyton
(74) *Attorney, Agent, or Firm* — Mark A. Logan; PatServe (57) ABSTRACT

A system for communication with a field device, comprising: an apparatus which includes a communication module and an adapter. The communication module includes a connection region and a communication area. The communication area includes at least one communication interface for communication for the field device. A first connecting structure is provided on the connection region, and a second connecting structure provided on an adapter, wherein the second connecting structure is embodied complementary to the first connecting. The adapter includes an interface, and
(Continued)

the adapter is embodied passively A display/servicing device, wherein the interface is embodied for connection to the display/servicing device, wherein the display/servicing device is embodied as a portable mobile device, wherein the mobile device is embodied for single-use battery- or rechargeable battery operation, and wherein the first connecting, the second connecting structure and the interface are embodied as plug contacts.

15 Claims, 9 Drawing Sheets

(52) U.S. Cl.
CPC .............. *G05B 2219/23406* (2013.01); *G05B 2219/31131* (2013.01); *G05B 2219/31205* (2013.01); *Y02P 90/18* (2015.11)

(58) Field of Classification Search
USPC .......................................................... 710/301
See application file for complete search history.

(56) References Cited

U.S. PATENT DOCUMENTS

| | | | |
|---|---|---|---|
| 7,844,410 B2 * | 11/2010 | Lalla | G01F 1/8409 323/209 |
| 7,983,049 B2 * | 7/2011 | Leifer | H05K 1/141 361/728 |
| 9,473,554 B2 * | 10/2016 | Isozu | H04L 67/025 |
| 2006/0282580 A1 | 12/2006 | Russell | |
| 2010/0145476 A1 | 6/2010 | Junk | |
| 2012/0182119 A1 * | 7/2012 | Vetter | H04L 67/125 340/4.3 |
| 2012/0327107 A1 | 12/2012 | Fink | |

FOREIGN PATENT DOCUMENTS

| | | |
|---|---|---|
| CN | 201174708 Y | 12/2008 |
| CN | 101825876 A | 9/2010 |
| CN | 201796248 U | 4/2011 |
| CN | 202005077 U | 10/2011 |
| DE | 10356985 A1 | 7/2005 |
| DE | 102005058564 A1 | 7/2006 |
| DE | 1020060024743 A1 | 12/2007 |
| DE | 102007022991 A1 | 11/2008 |
| DE | 102009027949 A1 | 1/2011 |
| DE | 102009047060 A1 | 5/2011 |
| WO | 2010094301 A1 | 8/2010 |

OTHER PUBLICATIONS

International Search Report, EPO, The Netherlands, Dec. 17, 2013.
English Translation of the International Preliminary Report on Patentability, WIPO, Geneva, CH, Mar. 26, 2015.

* cited by examiner

APPARATUS FOR TRANSMITTING AND/OR RECEIVING MEASUREMENT DATA OF A FIELD DEVICE WITH PASSIVE ADAPTER INTERFACE

TECHNICAL FIELD

The invention relates to an apparatus for transmitting and/or receiving measurement data of a field device, an operating state of the field device, control signals for the field device and/or service signals of the field device, as well as to a system.

BACKGROUND DISCUSSION

Field devices are technical systems used in automation technology. Field devices interface directly with a production process. "Field" means in automation technology the area outside of circuit cabinets, respectively control stations. Field devices include, in such case, both actuators (control elements, valves, . . . ), sensors (pH, temperature, conductivity, turbidity, . . . ) as well as also measurement transmitters.

Without the intent to limit the wide application of the invention, the technical problem will be explained in the context of a sensor.

Sensors are commercially obtainable, which can be connected directly to a fieldbus. It is, thus, no longer absolutely necessary that sensors be connected with a measurement transmitter. In such case, the first opportunity to be able to display measurement data of the sensor, the state of the sensor and the like, is at a site remote from the sensor, e.g. at a control room, for instance. For checking state, for quick registering of measured values on-site or for certain operations, especially for calibrating, it is nevertheless necessary to have a display opportunity directly in the immediate vicinity of the sensor. Thus, the sensor, e.g. during calibrating, can issue instructions, such as "immerse in first solution, register measured value, immerse in second solution, register measured value, etc."

SUMMARY OF THE INVENTION

An object of the invention is to provide an apparatus and a system, which enable fast and simple communication with a field device on-site.

The object is achieved by a system for communication with a field device, especially for transmitting and/or receiving measuring-, state- and/or service signals of the field device, and control signals for the field device, as well as for display of the same. In such case, an apparatus of the system includes a communication module and an adapter, wherein the communication module includes a connection region and a communication area, wherein the communication area includes at least one communication interface for communication for the field device, and wherein first connecting means are provided on the connection region. Provided on the adapter are second connecting means, wherein the second connecting means are embodied complementary to the first connecting means, wherein the adapter includes an interface, and wherein the adapter is embodied passively. In this regard, the system includes a display/servicing device, wherein the interface is embodied for connection to the display/servicing device, wherein the display/servicing device is embodied as a portable mobile device, wherein the mobile device is embodied for single-use battery- or rechargeable battery operation, and wherein the first connecting means, the second connecting means and the interface are embodied as plug contacts.

If the system is embodied as a modular system composed of apparatus and display/servicing device, the posed object is fulfilled. Especially advantageous is when the apparatus is also embodied as a modular apparatus composed of communication module and adapter.

The communication module is embodied as a universal part, i.e. the communication module can be used unchanged in different applications, especially different display/servicing devices can be connected to the apparatus. For instance, both the communication module as well as also the adapter can, in each case, be located in its own housing and be plugged by the plug contacts into one another.

If the display/servicing device is embodied as a portable mobile device, it can be universally applied anywhere where it is required, especially also at easily accessible locations, especially preferably also on the side of the field device, which, in given cases, is emplaced at difficulty accessible site.

"Passive" in the sense of this invention means non-energy consuming.

In a preferred embodiment, the communication interface is embodied as a wired interface, especially as an Ex-i interface. This enables application of the apparatus in an Ex-protected region.

In an especially preferred embodiment, the communication interface is embodied as a wireless interface. The advantages of an additional or alternative wireless interface lie in the fact that, for instance, the apparatus can be freely positioned. Especially, the apparatus is so emplaced that it is easily accessible.

In an advantageous form of embodiment, the wireless interface is an interface according to one of the standards, Bluetooth, Z-Wave, ANT, IEEE 802.11, especially WLAN, or IEEE 802.15.4, especially ZigBee. These standards enable simple setup and transmission with relatively little energy consumption.

Preferably, the communication for the field device is instantaneously available. Thus, little time passes before a service technician can immediately begin with the tasks to be performed.

In a form of embodiment, the mobile device is a mobile telephone, smart phone, personnel digital assistant or a tablet-PC and the interface is embodied for connection to the mobile telephone, smart phone, personal digital assistant or a tablet-PC. In today's environment, it can be assumed that a technician has on-site at least one of the mentioned devices, so that no additional device is needed.

Alternatively, the mobile device is a display in a housing, wherein the display includes a motherboard in a housing, wherein the communication module is positioned in the housing,
wherein the interface is embodied as an internal interface in the housing, especially as a plug-in card for the motherboard, or wherein the communication module is integrated into the motherboard.

If it is for different reasons, for instance, for safety-relevant reasons, not possible to bring along a device of the group, mobile telephone, smart phone, personal digital assistant or a tablet-PC, the application of a display with housing is then advantageous. The service technician has, in this alternative way, the opportunity to perform directly on-site the tasks to be done, since the display with housing is designed with such purpose in mind. Two scenarios can be considered: In the mobile application, the energy supply of the display in a housing occurs via battery and the communication module is integrated as a plug-in card or directly into the motherboard. Preferably, the display in a housing meets the requirements for Ex-protection, whereby it can be applied in an Ex-protected region of a plant. In the second case of application of the display in a housing, such can be mounted stationarily at locations where otherwise no display is possible. The energy supply can occur via rechargeable battery or single-use batteries, while, of course, also a connection to the electrical current grid is possible. Communication occurs also wirelessly or per cable, preferably per Ex-i. In the wireless case, the display in a housing can be positioned at an easily accessible site, even when the field device is positioned remotely.

In an additional alternative, the mobile device is a portable computer, notebook, sub-notebook, netbook or desk note. Usually, mobile devices of this group have a better computing power than the devices already mentioned, so that more complex tasks can be performed.

In an additional alternative, the mobile device is a virtual sensor, a service unit or a measurement transmitter.

A virtual sensor is able to simulate a certain measured value, i.e. the virtual sensor sends a measurement signal, which corresponds to actual measuring. A service unit is a device, which can read out and evaluate the status of a second field device.

A multitude of opportunities for application result when the interface is a USB interface. Since USB has been a standard for a long time, the most varied of end devices can be connected.

In a form of embodiment, the communication module and the adapter are embodied as one unit.

In a further development, the service signals are signals for diagnosis, maintenance and/or calibrating. These are typical service tasks, which require a display/servicing device.

The object is further achieved by an arrangement having at least one system and at least one field device, wherein provided in the field device is a transmitting/receiving unit for communication with the system, wherein the transmitting/receiving unit is embodied as a plug-in card in the field device, integrated into the field device, as a plug-on module for the field device or as a plug-in module for the field device.

The plug-in card can be plugged, for instance, into the motherboard of the field device or be integrated directly into the field device (for instance, as part of the motherboard). A plug-on module means, for instance, a module with cable, which is connected to the field device. The module can, thus, be optimally emplaced. A plug-in module means a module, which is directly plugged into the field device.

The mentioned advantages of the system are thus expanded to an arrangement, wherein the field device is preferably a sensor, an actuator, a virtual sensor, a measurement transmitter and/or a displayless measurement transmitter.

To summarize the advantages: The service technician can work with a mobile device, ideally one already present, thus especially a smart phone or the like, in the vicinity of a field device and instantaneously establish a connection. Thus, the service technician can, for instance, retrieve measurement data, issue control commands or perform service tasks. Especially, these are tasks, which require a display and interaction, such as e.g. calibrating.

Since the communication module is implemented as a universal part, the most varied of mobile devices can be applied. Especially, a display can be placed at an easily accessible position and in an Ex-region.

BRIEF DESCRIPTION OF THE DRAWINGS

The invention will now be explained in greater detail based on the appended drawing, the figures of which show as follows.

In the figures, equal features are provided with equal reference characters.

DETAILED DISCUSSION IN CONJUNCTION WITH THE DRAWINGS

Figure 1A:
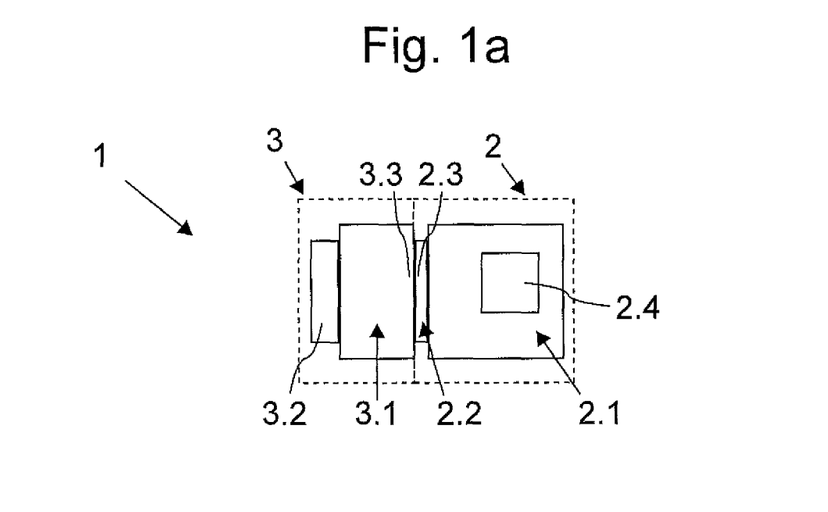
FIG. 1a the apparatus of the system of the invention.

The apparatus 1 as part of the system 100 of the invention bears in its totality the reference character 1 and is shown in FIG. 1a. Apparatus 1 has a manageable size in the order of magnitude of a USB-stick, thus, for instance, a few centimeters, especially 1-5 cm.

Apparatus 1 is composed of a communication module 2 and an adapter 3. The communication module 2 is divided into a communication area 2.1 and a connection region 2.2. Provided in the connection region 2.2 are first connecting means 2.3. Provided on the adapter 3 are second connecting means 3.3, which are embodied to be complementary to the first connecting means 2.2. Implemented here are, for instance, plug contacts or plug-socket combinations. Contact can also be effected by screws, especially knurled screws. Besides this mechanical coupling, the connecting means 2.3, 3.3 also effect electrical contacting, especially of the communication interface 2.4 (in the communication module 2; for details see below) to the adapter logic 3.1.

Located on the side lying opposite the second connecting means 3.3 is an interface 3.2 for connection to a display/servicing device 4. See in this connection, for example, FIG. 2a. Interface 3.2 is embodied specifically for the display/servicing device 4, i.e. the interface 3.2 is suitably embodied as a function of the display/servicing device 4 to be connected.

Communication module 2 is embodied as a universal part, i.e. the communication module 2 can be used unchanged in different applications, especially different display/servicing devices 4 (see below) can be connected to the apparatus 1.

The adapter logic 3.1 forwards to the interface 3.2 the communication signals of the communication interface 2.4 led via the connecting means 2.3, 3.3 to the adapter 3. Depending on display/servicing device 4, the adapter logic 3.1 performs appropriate redirecting of signals, etc. Preferably, the adapter logic 3.1 is embodied passively, i.e. it consumes no energy.

In FIG. 1a, each of the communication module 2 and adapter 3, is placed in its own housing. These are connected with one another by the plug contacts 2.3, 3.3.

Figure 1B:
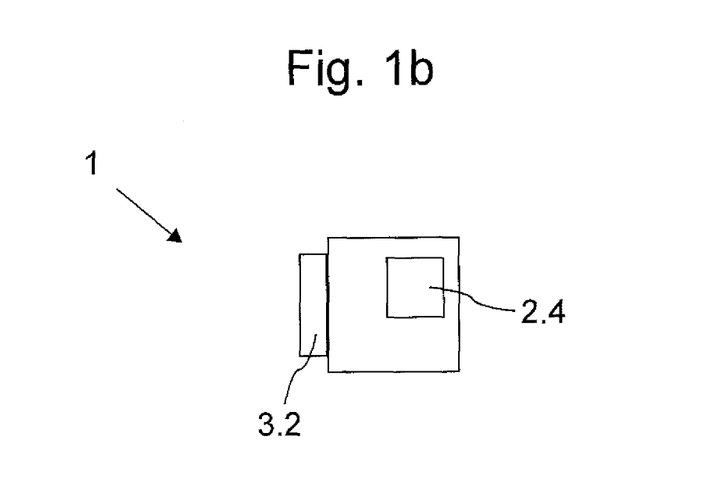
FIG. 1b the apparatus of the system of the invention in an embodiment.

FIG. 1b shows an embodiment of the apparatus 1. In FIG. 1b the communication module and the adapter are embodied as one unit, i.e. a one-piece module in only a single housing. The connecting means 2.3, 3.3 are then unnecessary.

Figure 2A:
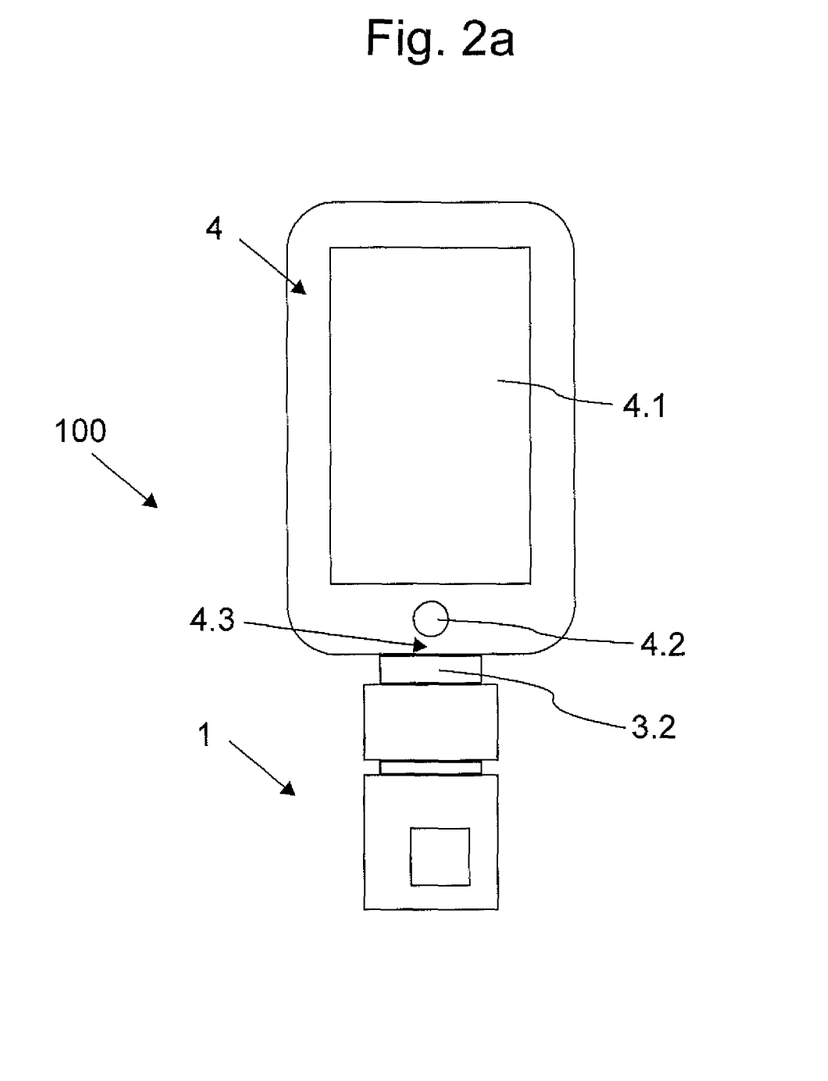
FIG. 2a the system of the invention.
Figure 2B:
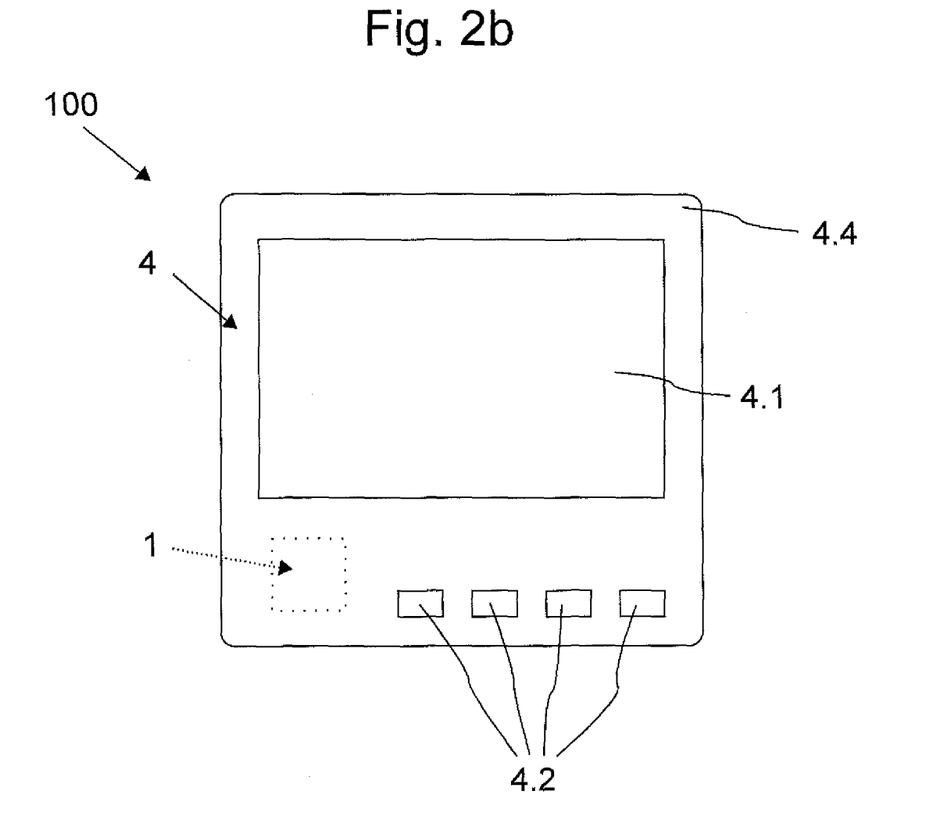
FIG. 2b the system of the invention in an embodiment.

Via interface 3.2, the apparatus 1 can be connected to a display/servicing device 4; see FIG. 2a and FIG. 2b.

Display/servicing device 4 includes at least one display 4.1 and at least one actuating element 4.2. Display/servicing device 4 is embodied as a mobile device. Apparatus 1 and the display/servicing device 4 form the system 100 of the invention.

Display/servicing device 4 is shown in FIG. 2a as a smart phone. Embodiments can include a mobile telephone, personal digital assistant or a tablet-PC. Display/servicing device 4 in FIG. 2a includes an interface 4.3. Apparatus 1 is connected via its interface 3.2 to the interface 4.3 of the display/servicing device 4.

If the display/servicing device 4 is, for instance, a device of the firm, Apple Inc., especially an iPhone, iPad or iPod, then the interface 3.2 is embodied as a correspondingly designed, Dock adapter.

If the display/servicing device 4 is, for instance, a device with an Android operating system, then the interface 3.2 is embodied as an adapter corresponding to that system, for instance, a mini-USB interface or a micro-USB interface. Also, in the case of mobile devices with other operating systems, thus, for instance, Palm webOS, Windows mobile, Symbian, BlackBerry OS or bada, the interface 3.2 is suitably embodied for such mobile device 4, wherein, most recently, different kinds of USB (e.g., the already mentioned mini- or micro-USB) have become more common than various manufacturer specific, proprietary solutions. Since a mini- or micro-USB plug, in contrast to the mentioned Apple Inc. Dock adapter, can carry no mentionable mechanical forces, also a corresponding cable can serve as interface 3.1.

As already mentioned, communication module 2 is embodied as a universal part and only the adapter is matched to the display/servicing device 4.

FIG. 2b shows a display/servicing device 4, which is embodied as a single-use or rechargeable battery operated display 4.1 in a housing 4.4 with actuating elements 4.2. Apparatus 1 is, in such case, placed as an internal module in the housing 4.4, as shown in FIG. 2b and the subsequent figures by the dashed box. Display/servicing device 4 includes a motherboard, wherein the apparatus 1 can then be implemented as a plug-in card for the motherboard. Alternatively, the apparatus can be integrated directly into the motherboard. Again, the same communication module 2 is used and the adapter 3 is designed as a plug-in card or integrated into the motherboard.

As another embodiment, the interface 3.2 is embodied as a USB interface. Thus, the interface 3.2 can be embodied as a standard USB plug. Apparatus 1 is, thus, able to be connected to a display/servicing device 4, which is embodied as a portable computer, notebook, sub-notebook, netbook or desk note.

Figure 3A:
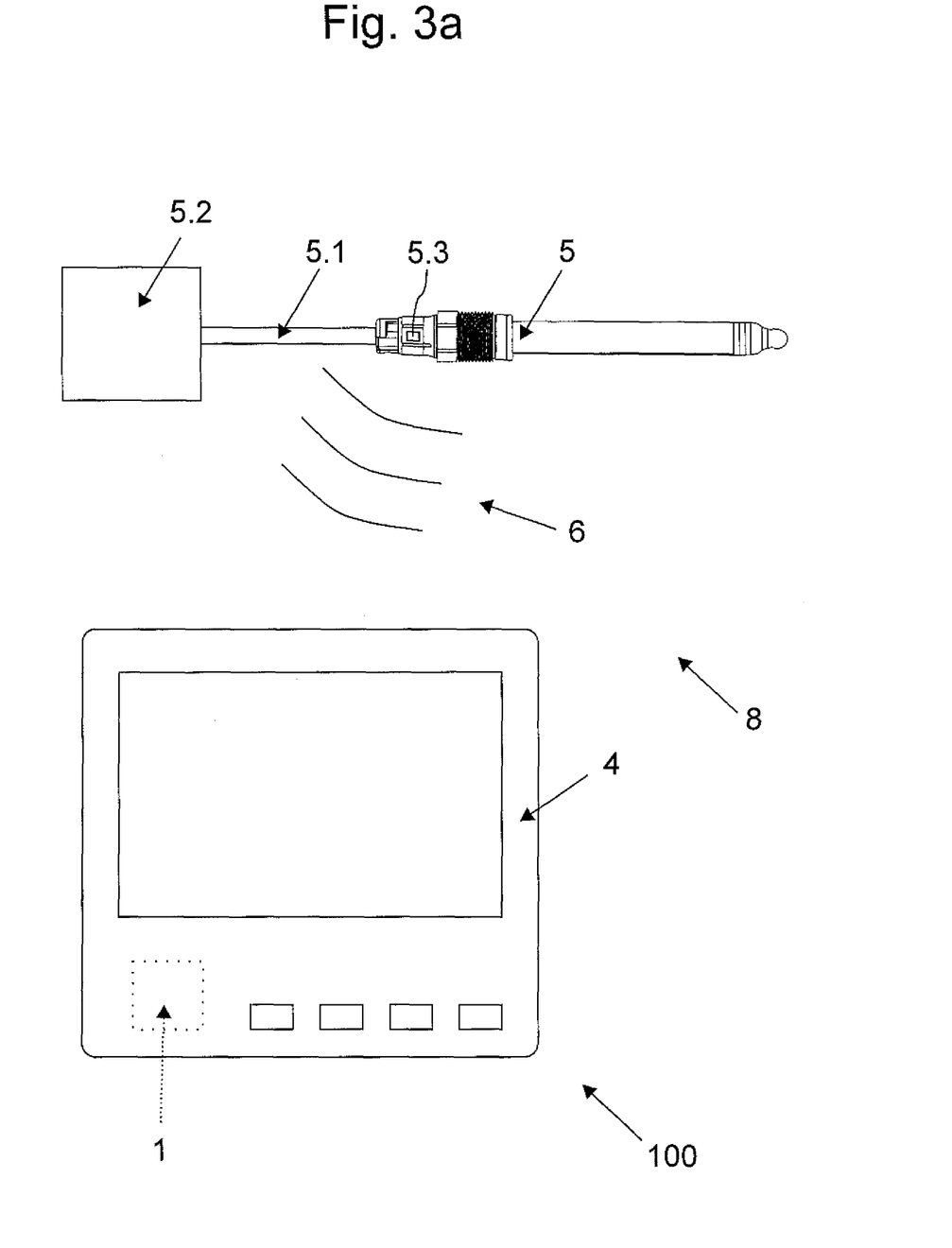
FIG. 3b the arrangement of the invention in an embodiment.

Shown in FIG. 3a is the arrangement 8 of the invention. In addition to the display/servicing device 4 with integrated apparatus 1, there is a field device 5. Field device 5 is embodied as a sensor, for instance, embodied as a pH, redox-potential-, temperature-, conductivity-, pressure-, flow-, fill level-, density-, viscosity-, oxygen-, carbon dioxide- or turbidity sensor. Measuring devices suitable for determining the corresponding process variables are manufactured and sold in a large number of versions by the group of firms, Endress+Hauser. Without limitation, the field device 5 in FIG. 3a is embodied as a pH-sensor.

Sensor 5 is connected via a cable 5.1 directly with a superordinated system, for instance, a control system 5.2.

Located on the or in the sensor 5 is a transmitting/receiving unit 5.3. Transmitting/receiving unit 5.3 communicates as shown by way of example by the radio waves 6 with the display/servicing device 4, especially with the apparatus 1, especially with the communication module 2 and especially via the communication interface 2.4.

Communication 6 between field device and communication interface 2.4 in the display/servicing device 4 occurs wirelessly. Communication 6 occurs especially according to one of the standards, Bluetooth, Z-Wave, ANT, IEEE 802.11, especially WLAN, or IEEE 802.15.4, especially ZigBee.

Preferably, IEEE 802.15.4 is used. This standard defines the lowest two layers of the OSI model, the bit transmission- and the MAC layers. Higher protocol levels with functions for routing and an application interface can be defined in other ways, for instance, by standards such as ZigBee or in-house proprietary solutions. Essential properties are low power consumption and use of the license free, ISM bands.

By application of the IEEE 802.15.4-standard, a connection can be produced between field device 5 and display/servicing device 4 instantaneously and simply. Thus, the display/servicing device 4 can transmit and/or receive measurement data of the field device 5, the operating state of the field device 5, control signals for the field device 5 and/or service signals (for instance, for diagnosis, maintenance or calibrating) of the field device 5.

A typical example of application is calibrating. Calibrating requires interaction with the service technician: Immerse in first solution, register measured value, immerse in second solution, register measured value, etc. In such case, the technician must know what to do when. This requires a display. As mentioned, the field device 5 is connected directly with the control system 5.2 and no display is provided therebetween. With the help of the apparatus 1, respectively with the assistance of the arrangement 8 of the invention, the technician can, in spite of this situation, perform calibrating and other service tasks on-site.

Display/servicing device 4 is, in such case, either a device, which the service technician has as a matter of course, for instance, a mobile telephone (compare FIG. 2a), or a display in a housing (compare FIG. 2b).

Figure 3B:
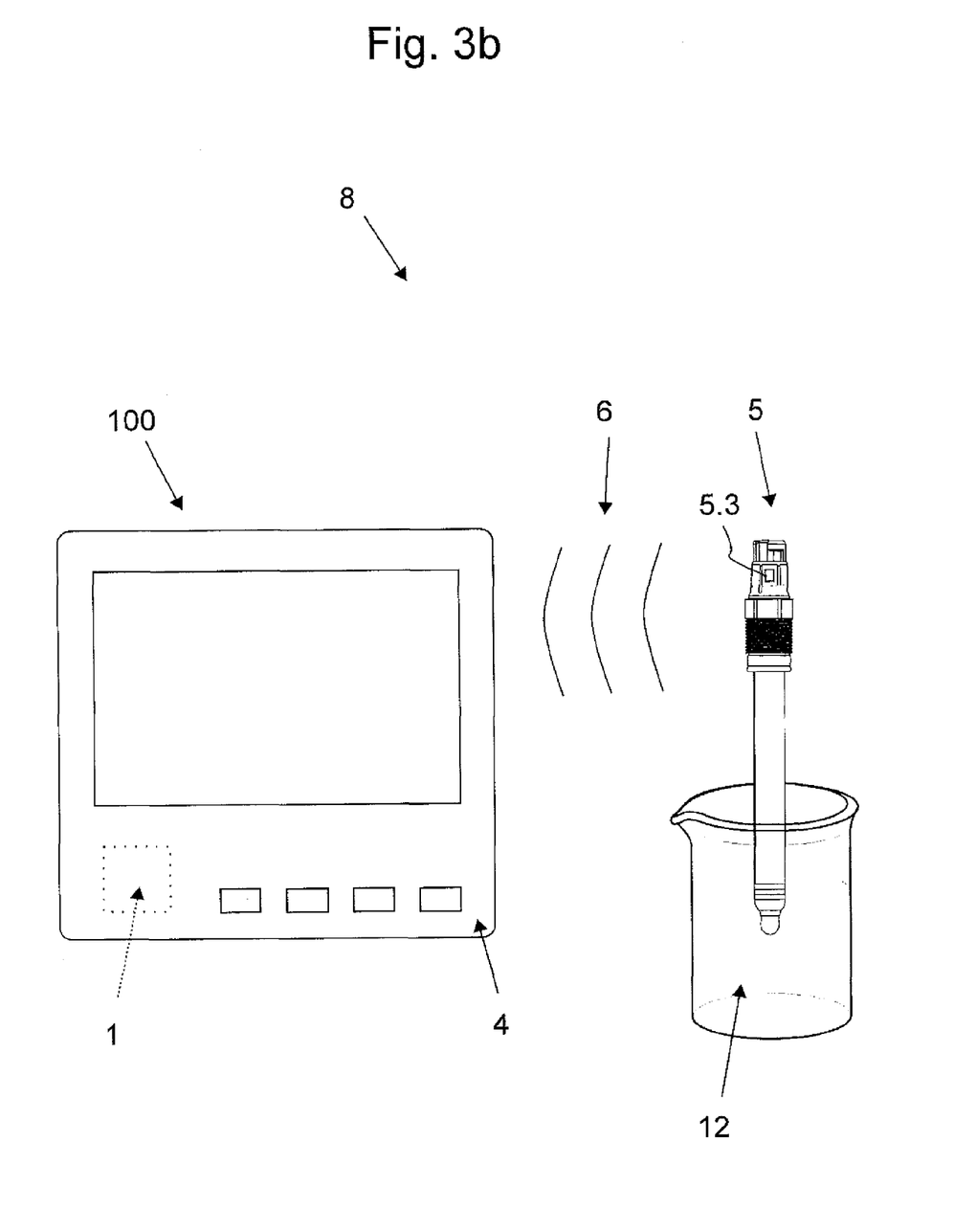

FIG. 3b shows a situation, in which the field device 5 is not connected with a superordinated system 5.2. In FIG. 3b, the field device 5 is used in a laboratory environment. Field device 5 is, in such case, held in a containment 12 and measures the parameter to be measured. Field device 5 functions, in such case, with power from a single-use battery or a rechargeable battery.

The transmitting/receiving unit 5.3 is, in such case, either integrated in the field device 5 or the apparatus 1 is connected as a plug-in module directly with the field device 5, i.e. the apparatus 1 is plugged via the mentioned interface 3.2 into the field device 5 (similarly as a USB-flash memory is plugged into a computer). Located on the field device 5 is a corresponding interface, which is embodied complementarily to the interface 3.2.

Figure 4A:
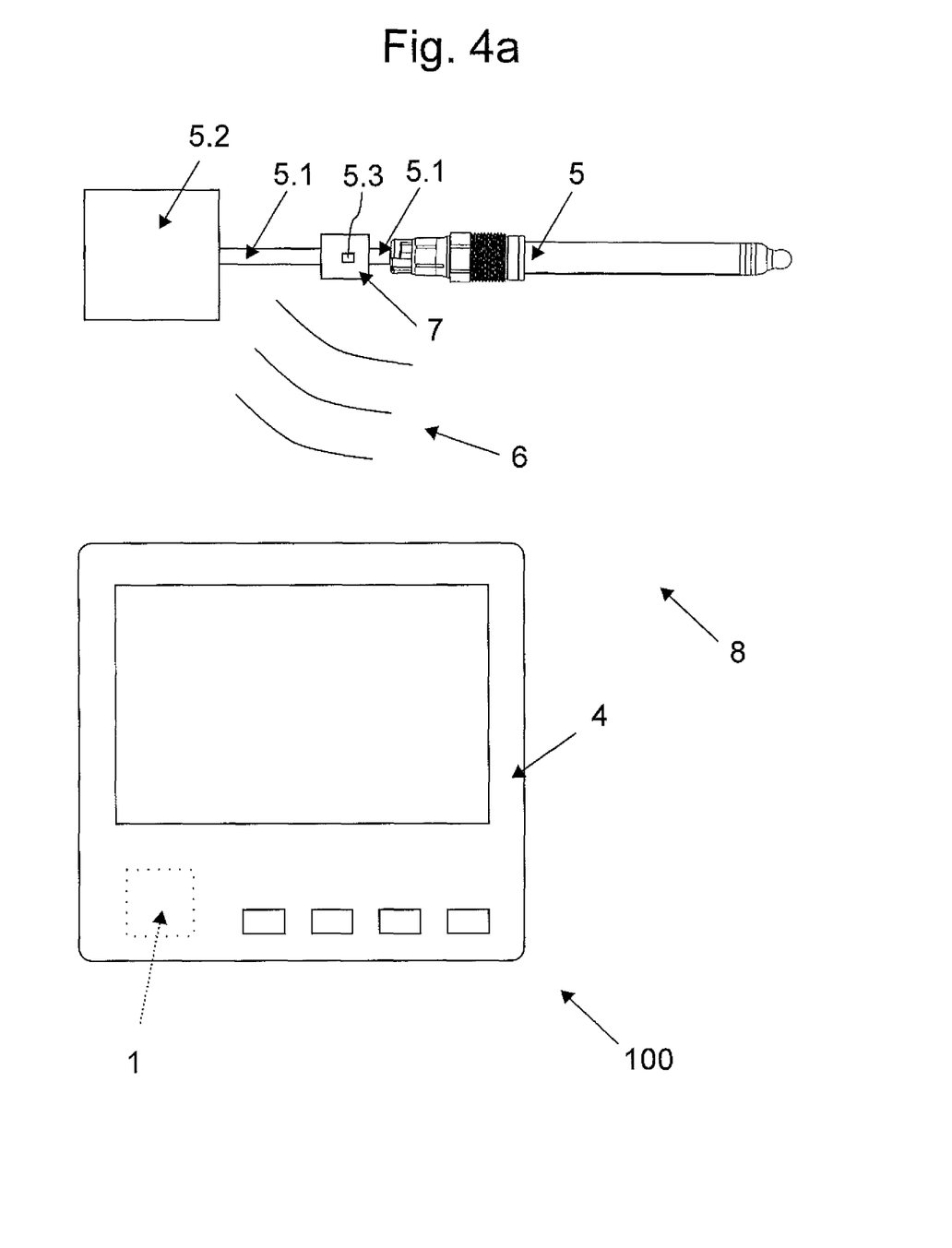
FIG. 4a the arrangement of the invention in an additional embodiment.

In FIG. 4a, the transmitting/receiving unit 5.3 is installed not in the field device 5 (compare FIG. 3a or FIG. 3b), but, instead, is located in a second field device 7, which is separated from the field device 5. The second field device 7 is implemented as a displayless measurement transmitter. This can be necessary, when there is no room in the field device 5 for the transmitting-/receiving unit 5.3. The displayless measurement transmitter 7 is connected via a cable 5.1 with the field device 5 and with the superordinated system 5.2. Otherwise, FIG. 4a shows the same construction as FIG. 3a.

Figure 4B:
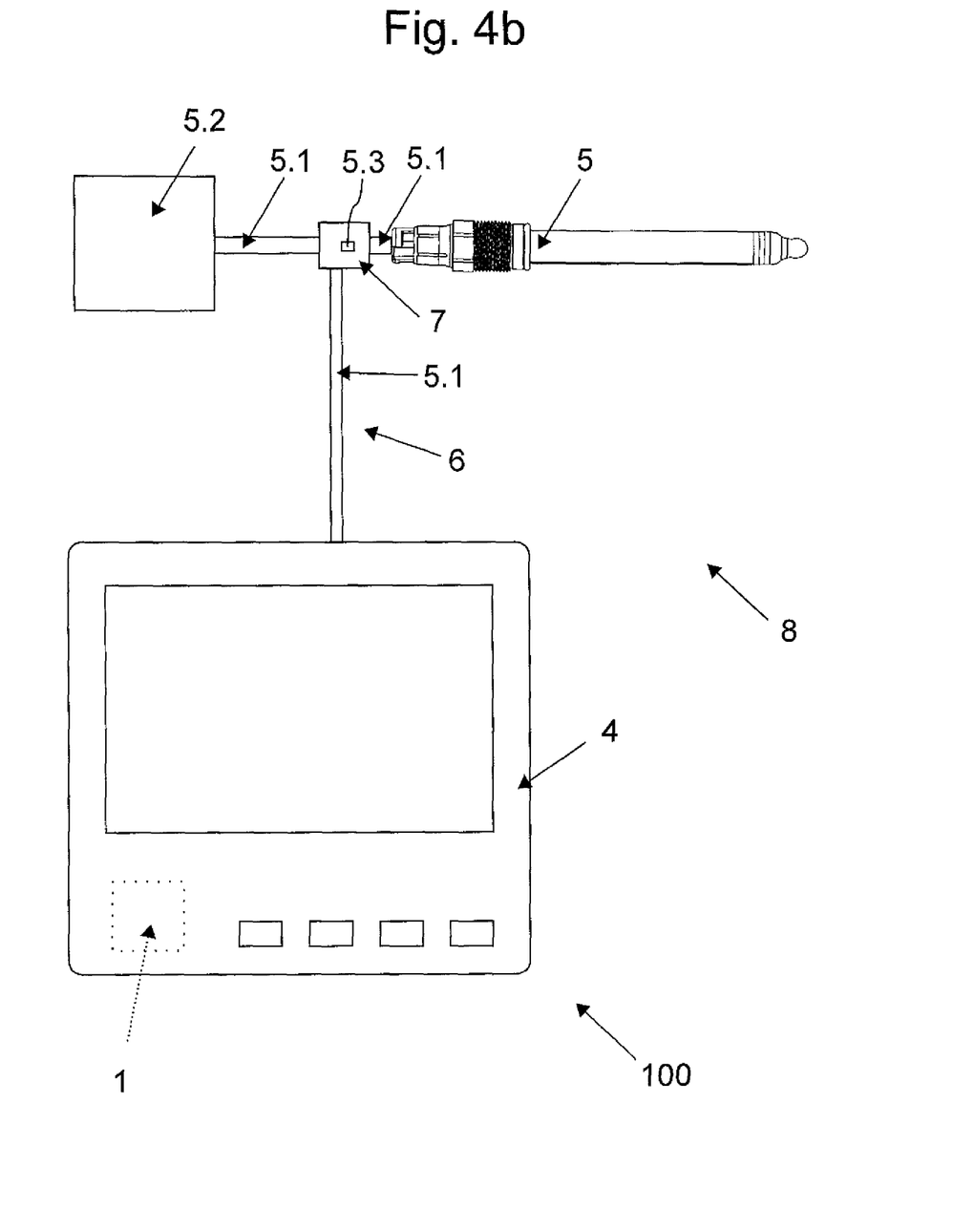
FIG. 4b the arrangement of the invention in an additional embodiment.

FIG. 4b shows a construction similar to that of FIG. 4a, except that the communication 6 occurs not wirelessly, but, instead, via a cable.

Figure 5A:
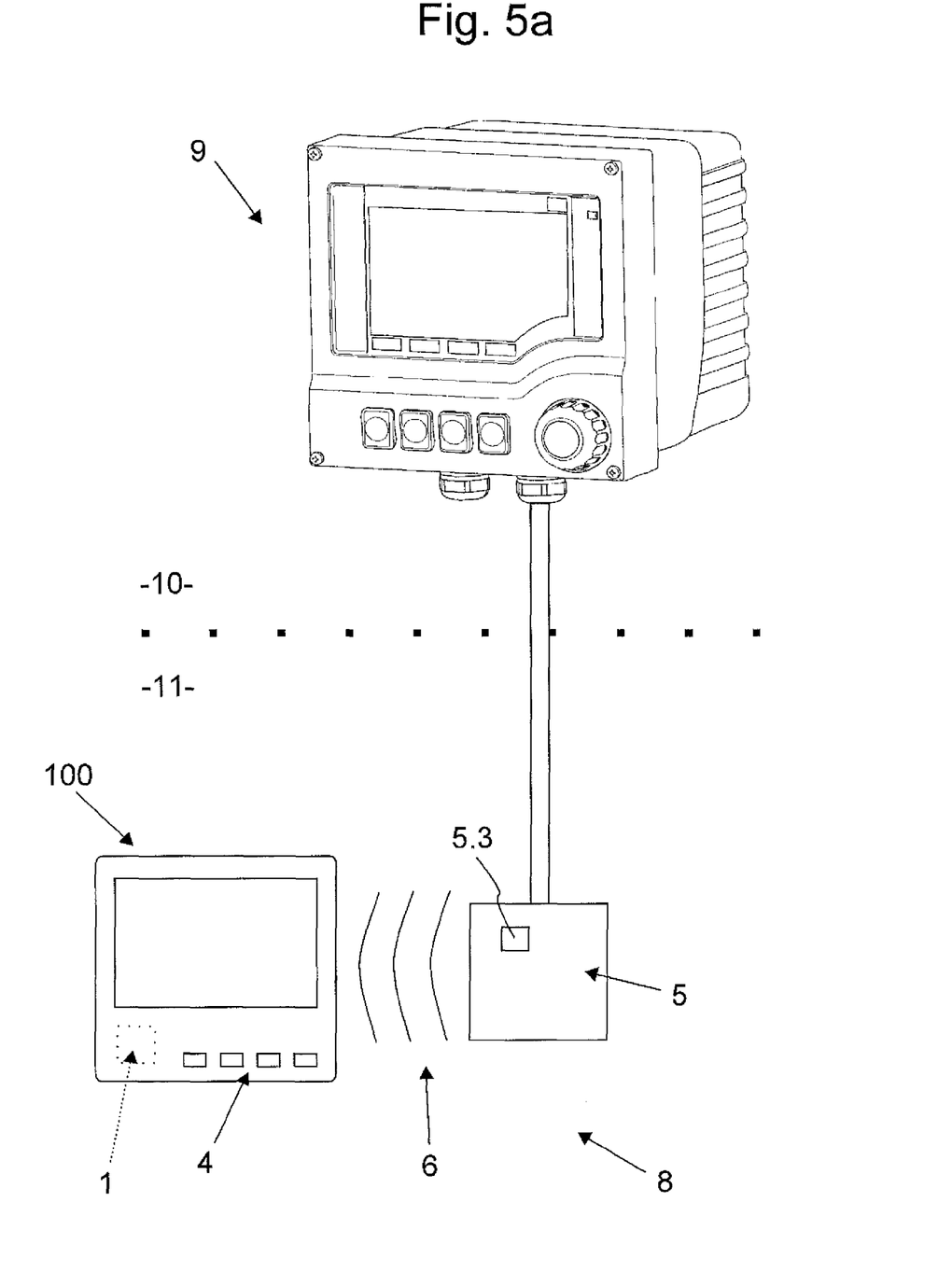
FIG. 5a the arrangement of the invention in a typical application.

FIG. 5a shows a typical application of the arrangement 8. A measurement transmitter 9 is connected via a cable with a field device 5, often a sensor. In such case, the measurement transmitter 9 is located in a non-Ex-region 10 and the field device 5 in an Ex-region 11. Often it is desirable that also in the Ex-region 11 a display be available. Display/servicing device 4 is in an embodiment so designed that it meets the requirements of Ex-protection and can, thus, be positioned in the Ex-region 11. Communication 6 between field device 5 and display-/servicing device 4 occurs wirelessly.

Figure 5B:
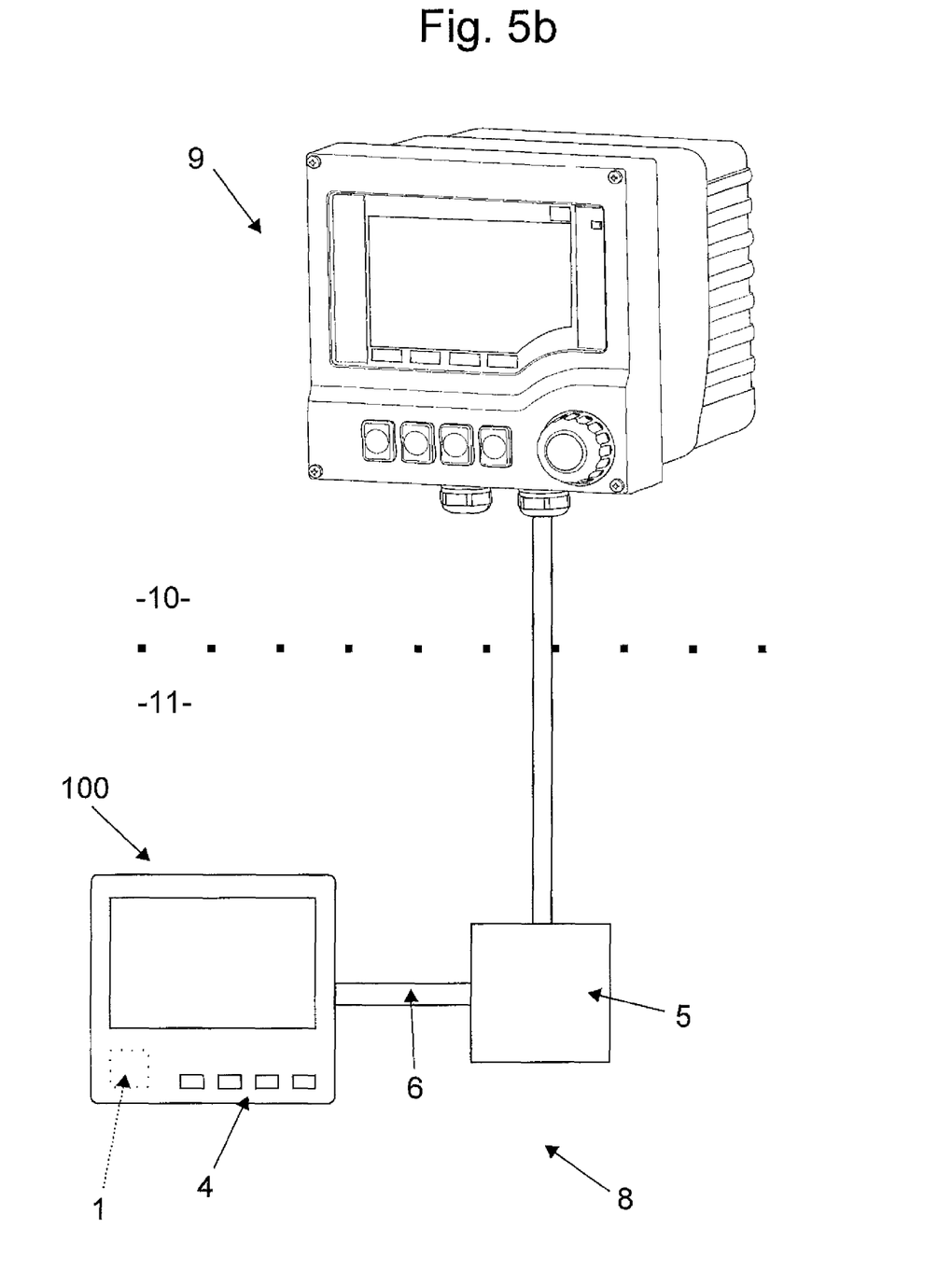
FIG. 5b the arrangement of the invention in an embodiment in a typical application.

FIG. 5b shows a construction similar to that of FIG. 5a, except that the communication 6 occurs not wirelessly, but, instead, via a cable. The cable fulfills especially the ignition protection type, intrinsic safety Ex-i.

Field device 5 can be variously embodied. Already mentioned were a sensor and a displayless measurement transmitter.

Other options include a virtual sensor, a service unit or a measurement transmitter.

An example of a virtual sensor is that manufactured and sold under the mark, Memocheck Sim, by the group of firms, Endress+Hauser. The Memocheck Sim virtual sensor is able to simulate a certain measured value, for example, a pH-value of 7, i.e. the Memocheck Sim virtual sensor issues a measurement signal, which corresponds to an actual measuring of a solution with a pH-value of 7. Apparatus 1 is connected with the virtual sensor in a variety of ways, far instance, as a plug-in card, as an integrated version, as a plug-on module or as a plug-in module. The virtual sensor forms then with the apparatus 1 the system 100 of the invention.

Furthermore, a service unit can be used as field device 5. A service unit is a device, which can read out and evaluate the status of a second field device. A service technician can then pinpoint and eliminate a possible defect in the second field device. Apparatus 1 can be connected with the service unit in many different ways, for instance, as a plug-in card, integrated into the service unit, as a plug-on module or as a plug-in module. The service unit then forms with the apparatus 1 the system 100 of the invention.

A measurement transmitter can also be used as field device 5. Apparatus 1 can then be connected with the measurement transmitter in many different ways, for instance, as a plug-in card, integrated, as a plug-on module or as a plug-in module. The service unit then forms with the apparatus 1 the system 100 of the invention.

The plug-in card can, for instance, be plugged into the motherboard of the field device or be integrated directly into the field device (for instance, as part of the motherboard). A plug-on module means, for instance, a module with cable, which is connected to the field device. The module can, thus, be optimally emplaced. A plug-in module means a module, which is directly plugged into the field device (for instance, in the same manner as a USB-flash memory is plugged into a computer).

Of course, also all combinations of the mentioned examples of embodiments are possible.

The invention claimed is:

1. A system for communication with a field device, for transmitting and/or receiving measuring-, state- and/or service signals of the field device, control signals for the field device, as well as for display of the same, comprising:
    an apparatus, said apparatus includes a communication module and an adapter, said communication module includes a connection region and a communication area, said communication area includes at least one communication interface for communication for the field device, and wherein first connecting means are provided on the connection region, and second connecting means are provided on said adapter, said second connecting means are embodied complementary to said first connecting means, said adapter includes an interface, and said adapter is embodied passively; and
    a display/servicing device, wherein:
    said interface is embodied for connection to said display/servicing device;
    said display/servicing device is embodied as a portable mobile device;
    said mobile device is embodied for single-use battery- or rechargeable battery operation; and
    said first connecting means, said second connecting means and said interface are embodied as plug contacts.

2. The system as claimed in claim 1, wherein:
    said communication interface is embodied as a wired interface, especially as an Ex-i interface.

3. The system as claimed in claim 1, wherein:
    said communication interface is embodied as a wireless interface.

4. The system as claimed in claim 3, wherein:
    said wireless interface is an interface according to one of the standards, Bluetooth, Z-Wave, ANT, IEEE 802.11, especially WLAN, or IEEE 802.15.4, especially ZigBee.

5. The system as claimed in claim 4, wherein:
    said communication for the field device is instantaneously available.

6. The system as claimed in claim 1, wherein:
    said mobile device is a mobile telephone, smart phone, personal digital assistant or a tablet-PC, and said interface is embodied for connection to said mobile telephone, smart phone, personal digital assistant or the tablet-PC.

7. The system as claimed in claim 1, wherein:
    said mobile device is a display in a housing;
    said display in a housing includes a motherboard;
    said communication module is positioned in said housing;
    interface is embodied as an internal interface in said housing, as a plug-in card for the motherboard; or
    said communication module is integrated into said motherboard.

8. The system as claimed in claim 7, wherein:
    said display in said housing meets the requirements for Ex-protection.

9. The system as claimed in claim 1, wherein:
    said mobile device is a portable computer, notebook, sub-notebook, netbook or desk note.

10. The system as claimed in claim 1, wherein:
    said mobile device is a virtual sensor, a service unit or a measurement transmitter.

11. The system as claimed in claim 1, wherein:
    said interface is a USB interface.

12. The system as claimed in claim 1, wherein:
said communication module and said adapter are embodied as one unit.

13. The system as claimed in claim 1, wherein:
said service signals are signals for diagnosis, maintenance and/or calibrating.

14. An arrangement comprising:
at least one system as claimed in claim 1 and at least one field device, wherein:
a transmitting/receiving unit is provided in the field device for communication with said at least one system;
said transmitting/receiving unit is embodied as a plug-in card in the field device, integrated into the field device, as a plug-on module for the field device or as a plug-in module for the field device.

15. The arrangement as claimed in claim 14, wherein:
the field device is a sensor, an actuator, a virtual sensor, a measurement transmitter and/or a displayless measurement transmitter.

\* \* \* \* \*